United States Patent [19]

Cameron

[11] Patent Number: 5,186,566
[45] Date of Patent: Feb. 16, 1993

[54] BASEBALL CARD STORAGE AND DISPLAY DEVICE

[76] Inventor: Michael E. Cameron, 311 Whitewood Pl., Encinitas, Calif. 92024

[21] Appl. No.: 798,077

[22] Filed: Nov. 25, 1991

[51] Int. Cl.⁵ .............................................. B42F 13/00
[52] U.S. Cl. ...................................... 402/79; 40/159;
      40/661; 206/449
[58] Field of Search .................... 40/152, 152.1, 159,
      40/661; 402/79; 206/449–456, 472

[56] References Cited

U.S. PATENT DOCUMENTS

| | | |
|---|---|---|
| 2,879,774 | 3/1959 | Siegel . |
| 3,371,439 | 3/1968 | Smith et al. ............... 40/159 X |
| 3,681,866 | 8/1972 | Loersch ....................... 40/152 |
| 4,829,691 | 5/1989 | Manjos et al. ............... 40/661 |
| 4,860,468 | 8/1989 | Cliborn . |
| 4,979,619 | 12/1990 | Hager . |
| 4,995,508 | 2/1991 | Burley . |
| 5,010,673 | 4/1991 | Connor et al. . |
| 5,040,671 | 8/1991 | Hager . |
| 5,056,251 | 10/1991 | Connor et al. ............. 40/661 |
| 5,087,145 | 2/1992 | Cooley ........................ 402/79 |

Primary Examiner—Bryon P. Gehman
Attorney, Agent, or Firm—Stetina and Brunda

[57] ABSTRACT

A baseball card mounting and display device comprising a pair of substantially rigid, transparent plastic plates which are arranged in a contiguous planar orientation. The bottom plate is formed to include a plurality of corner bosses which extend upwardly from the upper surface and the bottom plate for maintaining a baseball card in a desired orientation upon the upper surface. The corner bosses, which extend upwardly to a height equal to or slightly greater than the thickness of the baseball card, are oriented to substantially match the configuration of the baseball card and spaced from one another at distances substantially identical to the dimensions of the baseball card.

10 Claims, 3 Drawing Sheets

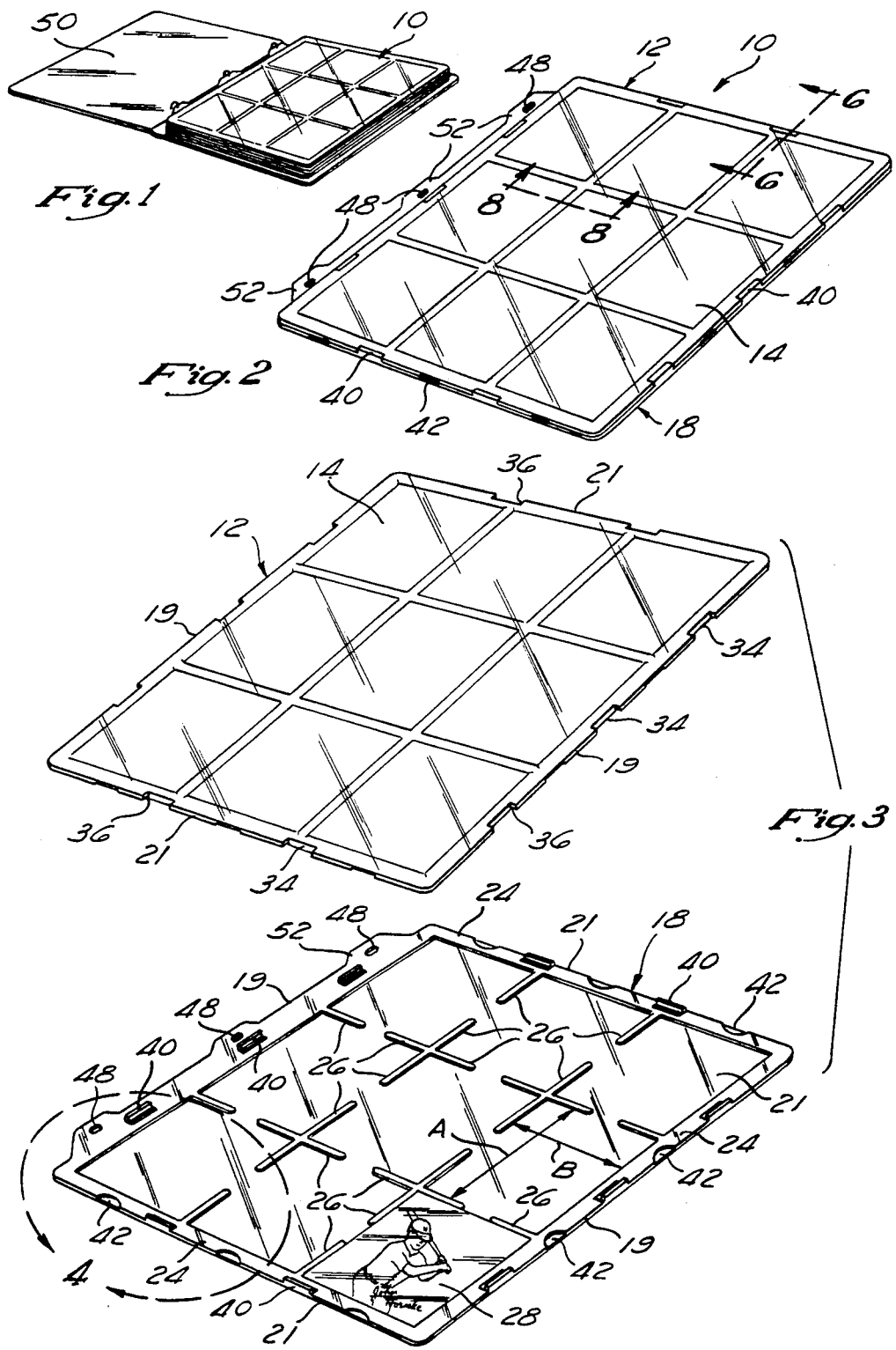

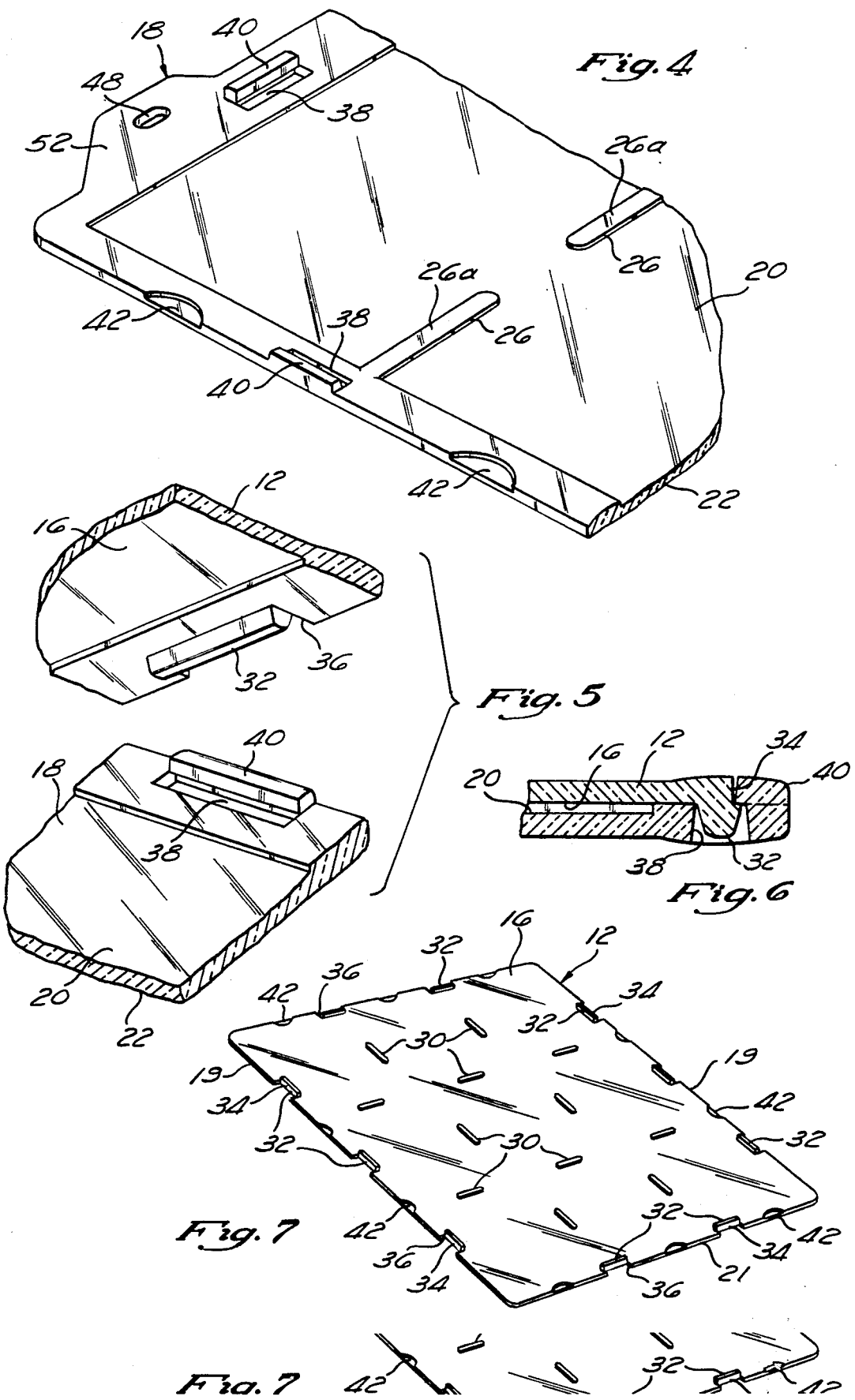

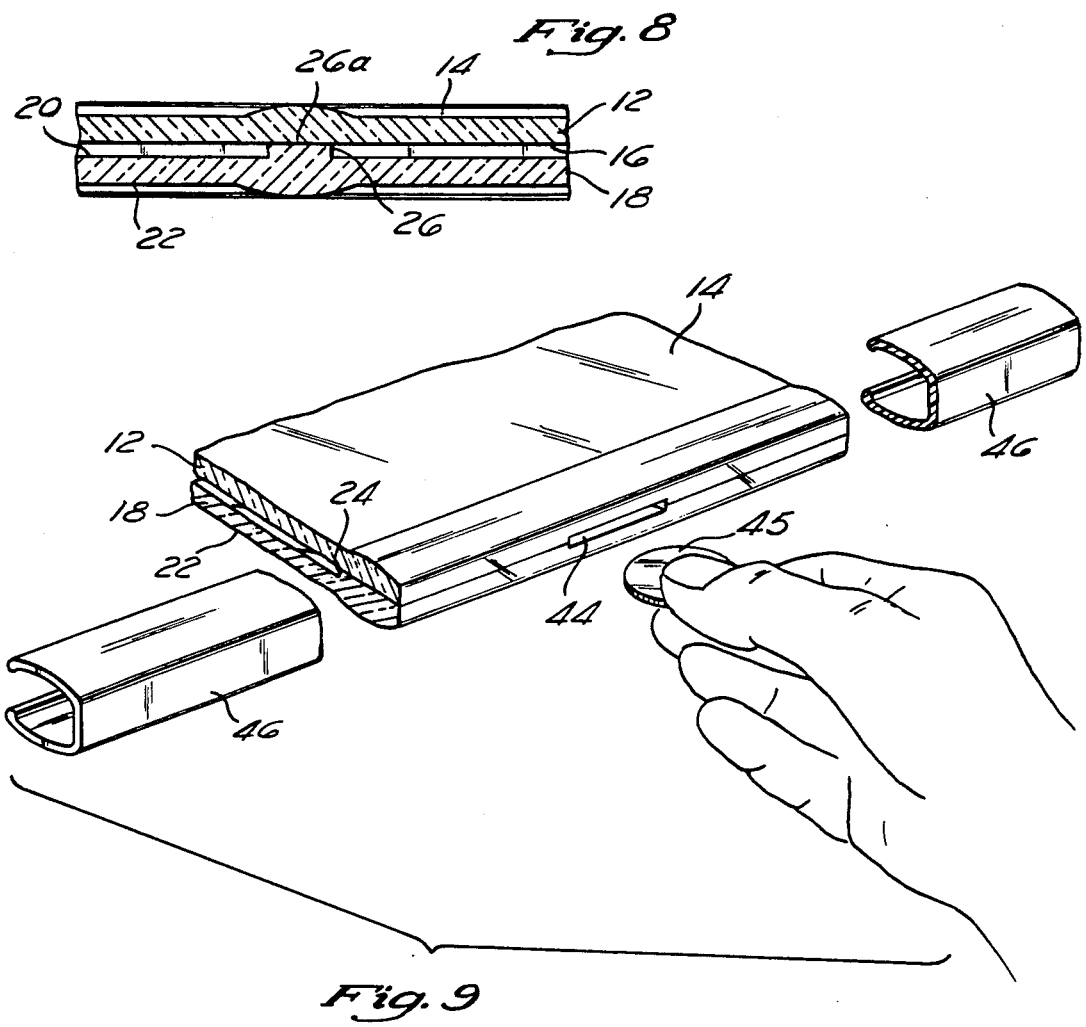

BASEBALL CARD STORAGE AND DISPLAY DEVICE

FIELD OF THE INVENTION

The present invention relates generally to display devices, and more particularly, to a device for storing and displaying baseball cards and the like which positively prevents damage to the cards while allowing the same to be rapidly inserted thereinto and/or removed therefrom.

BACKGROUND OF THE INVENTION

The collecting of sports cards, and particularly baseball cards, as both a hobby and for investment purposes has become a popular pastime for many individuals. Such sports cards generally have an elongate, rectangular shape and depict a professional player in a particular sport. The depiction is generally in the form of a photograph of the player which typically appears on one face of the card, with the other face including printed matter, such as performance statistics, team affiliations, or other information relevant to the depicted player.

With particular respect to baseball cards, as is well known to baseball card collectors, the economic value of the baseball card is primarily dependent upon its age, physical condition, and rarity. With regard to the physical condition of the card, oftentimes the frayed edges of older cards are trimmed by the card owner so as to enhance the card's appearance by eliminating the apparent damage to the edges thereof. Though this procedure may serve to enhance the card's appearance, such alteration diminishes the value of the baseball card.

Though many prior art display devices are currently known for encasing and protecting sports cards such as baseball cards, such devices possess certain inherent deficiencies which detract from their overall utility. In one popular prior art storage method, one or more baseball cards are maintained between sheets of a transparent, flexible plastic material. Though the plastic sheets serve to protect the cards, the sheets do not prevent the cards from being inadvertently folded or bent due to their lack of rigidity. Additionally, in the use of such plastic sheets as well as other prior art devices wherein flat panels are tightly pressed against the intervening baseball card, it has been found that over time the surfaces of the card may adhere to the plastic, thereby causing damage to the card when such is removed from between the plastic sheets or panels.

In other prior art baseball card storage devices, the baseball cards are stored in oases which are sealed through the utilization of certain glues. However, it has been found that the solvent vapors from the glue may be deleterious to the picture on the baseball card in long-term storage. Additionally, many prior art baseball card storage devices are configured in a manner wherein the baseball card may be easily damaged when being inserted thereinto or removed therefrom. Moreover, prior art storage devices are generally not adapted to provide a k, visual indication as to whether the baseball card has been altered, i.e. has had the edges thereof trimmed. The present invention overcomes these and other deficiencies associated with prior art baseball card/sports card storage and display devices.

SUMMARY OF THE INVENTION

In accordance with the preferred embodiment of the present invention, there is provided a device for storing and displaying collectable cards such as baseball cards and the like which positively prevents damage to the baseball cards while allowing the same to be rapidly inserted thereinto and/or removed therefrom. Particularly, the device comprises a pair of substantially rigid, transparent plastic plates which are secured to one another in a contiguous planar orientation such that the baseball card is disposed between the upper surface of the bottom plate and the bottom surface of the top plate. The bottom plate is formed to include a plurality of raised corner bosses which extend upwardly from the upper surface thereof and are used for maintaining the baseball card in a desired orientation upon the upper surface when the baseball card is inserted therebetween. In the preferred embodiment, the corner bosses are oriented to substantially match the configuration of the baseball card and spaced from one another at distances substantially identical to the dimensions of the baseball card. Additionally, the corner bosses extend upwardly from the upper surface to a height equal to or slightly greater than the thickness of the baseball card. In addition to maintaining a baseball card in a desired orientation upon the upper surface, the corner bosses, due to their particular spacing, also serve to allow a quick visual check to determine if the baseball card edges have been trimmed so as to eliminate any damage thereto. In the preferred embodiment, the corner bosses are formed to orient nine baseball cards upon the upper surface of the bottom plate.

The baseball card storage and display device of the present invention further comprises a plurality of elongate rib members formed on and extending downwardly from the bottom surface of the top plate. The rib members preferably have a height substantially equal to the thickness of the baseball card and a width substantially equal to the width of the corner bosses formed on the bottom plate. Additionally, the rib members are preferably oriented so as to be insertable between the corner bosses such that the rib members and the corner bosses will extend about the entire periphery of the baseball card when the top plate is secured to the bottom plate.

Once the baseball cards have been inserted between the corner bosses, the top plate is lowered downwardly onto the bottom plate to a point wherein the bottom surface thereof contacts the top surfaces of the corner bosses. As such, the baseball cards are not rigidly compressed between the bottom surface of the top plate and the upper surface of the lower plate. In accordance with a first embodiment of the present invention, the top plate is releasably secured to the bottom plate via the receipt of a plurality of look members formed about and extending downwardly from the peripheral edges of the top plate into a plurality of detents formed about the peripheral edges of the bottom plate. In the first embodiment, the top and bottom plates further include a plurality of coin receiving recesses formed about the peripheral edges thereof which are sized and configured to form coin receiving slots when the top plate is secured to the bottom plate. Advantageously, the coin receiving slots are sized to receive a portion of a coin to aid in releasing the lock members from engagement with the detents. In accordance with a second embodiment of the invention, the top plate is secured to the bottom plate by a pair of spring clips which are sized and configured to extend over and releasably receive at least two peripheral edges of the top and bottom plates.

Due to the top and bottom plates being formed of a rigid, substantially transparent plastic material, bending damage to the baseball cards is eliminated while both the front and rear sides of the baseball cards are viewable through the storage and display device. Further, when it is desired to remove a single baseball card from the device, the spring clips may be removed from the peripheral edges or the lock members released from engagement with the detents, and the top plate taken off. Once the top plate has been removed, a fingernail or knife may be used to selectively remove one of the baseball cards by sliding the same between the spacing between the corner bosses facilitated by the removal of the rib members from therebetween. As such, the present device allows rapid insertion and/or removal of singular cards therefrom. Further, one edge of the bottom plate may be provided with conventional three-ring binder apertures so as to allow the device to be assembled into a conventional three-ring binder.

BRIEF DESCRIPTION OF THE DRAWINGS

These as well as other features of the present invention will become more apparent upon reference to the drawings wherein:

FIG. 1 is a perspective view illustrating the baseball card storage and display device of the present invention as assembled into a conventional three-ring binder;

FIG. 2 is a perspective view of the storage and display device of the present invention;

FIG. 3 is an exploded view illustrating the top plate and bottom plate components of the display device;

FIG. 4 is a partial perspective view of the bottom plate of the display device, illustrating the detents and coin receiving recesses formed in the peripheral edges thereof;

FIG. 5 is an exploded view illustrating the lock members and detents formed on the top and bottom plates;

FIG. 6 is a cross-sectional view taken along line 6—6 of FIG. 2;

FIG. 7 is a perspective view of the underside of the top plate of the display device, illustrating the rib members formed thereon;

FIG. 8 is a cross-sectional view taken along line 8—8 of FIG. 2; and

FIG. 9 is an exploded view illustrating the formation of the coin receiving slots in the peripheral edges of the top and bottom plates and the spring clips which may be utilized as an alternative to the lock members and detents.

DETAILED DESCRIPTION OF THE PREFERRED EMBODIMENT

Referring now to the drawings wherein the showings are for purposes of illustrating preferred embodiments of the present invention only, and not for purposes of limiting the same, FIG. 2 perspectively illustrates the baseball/sports card storage and display device 10 constructed in accordance with the preferred embodiment of the present invention. As will be recognized, the present invention is applicable for storing all types of collectable cards such as baseball cards, football cards, basketball cards, hockey cards and other non-sport related cards. As such, for purposes of this application, the term baseball card and/or sport card shall be defined to include all collectable cards. As seen in FIGS. 2, 3, and 7, display device 10 generally comprises a substantially rigid top or front plate 12 having a generally planar top or front surface 14 and a generally planar bottom or rear surface 16 and a bottom or rear plate 18 having a generally planar upper surface 20 and a generally planar lower surface 22. In the preferred embodiment, top plate 12 and bottom plate 18 each have a generally rectangular configuration and define four peripheral edges, i.e. two longitudinal edges 19 and two lateral edges 21. Additionally, top plate 12 and bottom plate 18 are preferably fabricated from plastic which is transparent and of sufficient thickness to provide the top plate 12 and bottom plate 18 with substantial structural rigidity.

Formed on and extending upwardly from the upper surface 20 of bottom plate 18 is a rim member 24 which extends about the peripheral edges of upper surface 20, and a plurality of corner bosses 26 which are used for maintaining one or more baseball cards 28 in a desired orientation upon the upper surface 20 In the preferred embodiment, the corner bosses 26 are formed to orient nine baseball cards upon the upper surface 20. As best seen in FIG. 3, the rim member 24 and corner bosses 26 are formed to have substantially the same height with two corner bosses 26 extending perpendicularly from each of the four sides of the rim member 24. The corner bosses 26 formed upon the central portion of upper surface 20 are arranged in four groups of two, with each of the two corner bosses extending perpendicularly relative one another so as to define four 90-degree angles. As such, each baseball card disposed in one of the four corner portions of the upper surface 20 is maintained in place by a corner of the rim member 24, a corner boss 26 extending perpendicularly from a side of the rim member 24 formed along a longitudinal edge 19, a corner boss 26 extending perpendicularly from a side of the rim member 24 formed along a lateral edge 21, and one 90-degree angle portion defined by one of the four centrally disposed groups of corner bosses 26. The baseball card 28 disposed in the center of the upper surface 20 is maintained in place by one 90-degree angle portion defined by each of the four centrally disposed groups of corner bosses 26. Finally, each baseball card 28 disposed between those cards disposed in the corner portions of the upper surface 20 are maintained in place by the two corner bosses 26 extending perpendicularly from one side of the rim member 24 and two 90-degree angle portions defined by two of the four centrally disposed groups of corner bosses 26.

In the preferred embodiment, the corner bosses 26 are oriented to substantially match the configuration of the baseball card 28 and are spaced from one another at distances substantially identical to the dimensions of the baseball card 28. Additionally, the corner bosses 26, as well as the rim member 24, extend upwardly to a height substantially equal to the thickness of the baseball card 28. Particularly, the distance A separating those corner bosses 26 which are parallel to lateral edges 21 or a corner boss 26 and a side of the rim member 24 which are parallel to lateral edges 21, substantially matches the length of the baseball card and is approximately $3\frac{1}{2}$ inches. Additionally, the distance B separating those orner bosses 26 which are parallel to longitudinal edges 19 or a corner boss 26 and a side of rim member 24 which are parallel to longitudinal edges 19, substantially matches the width of the baseball card 28 and is approximately $2\frac{1}{4}$ inches. Further, the height of the corner bosses 26 and rim member 24 which substantially matches the thickness of the baseball card is approximately 20/1000 inches. In assembling the display device 10, the top plate 12 and bottom plate 18 are secured to one another in a contiguous planar orientation such that the bottom surface 16 of top plate 12 is abutted against the top surfaces 26a of the corner bosses 26 in the manner shown in FIG. 8. As such, when the top plate 12 is secured to the bottom plate 18, the baseball card 28 is disposed, but not compressed, between the upper surface 20 and the bottom surface 16. The manner in which the top plate 12 is secured to the bottom plate 18 will be explained in greater detail below.

As best seen in FIG. 7, formed on and extending downwardly from the bottom surface 16 of top plate 12 are a plurality of elongate rib members 30. In the preferred embodiment, each of the rib members 30 has a height substantially equal to the thickness of the baseball card and a width substantially equal to the width of the corner bosses 26. Additionally, the rib members 30 are oriented on the bottom surface 16 so as to be insertable between the corner bosses 26 such that the rib members 30 and corner bosses 26 extend about the entire periphery of the baseball card 28 when the top plate 12 is secured to the bottom plate 18. Thus, for each baseball card 28 disposed in one of the four corners of the upper surface 20, two rib members 30 are inserted between the corner bosses 26 to circumvent the periphery of the baseball card 28. For the baseball card 28 disposed in the center of the upper surface 20, four rib members 30 are inserted between the corner bosses 26 to circumvent the periphery of the baseball card 28. As will be recognized, the combination of the rib members 30 used to circumvent the baseball cards 28 disposed in the corners and center of upper surface 20 also serve to circumvent those cards disposed between the cards positioned in the corners. As can be appreciated, the number of rib members 30 formed upon the bottom surface 16 will correspond to the number of corner bosses 26 formed upon upper surface 20.

Referring now to FIGS. 3-6, to facilitate the attachment of the top plate 12 to the bottom plate 18, formed about and extending downwardly from the four peripheral edges of top plate 12 are a plurality of elongate lock members 32. As best seen in FIG. 6, each of the lock members 32 defines a step 34 therewithin, the use of which will be explained in greater detail below. Importantly, each of the lock members 32 extends downwardly from the inner edge of a respective one of the generally rectangular recesses 36 formed in the peripheral edges of the top plate 12. In the preferred embodiment, the longitudinal peripheral edges 19 of top plate 12 include three recesses 36 and thus three lock members 32 extending downwardly therefrom while the lateral peripheral edges 21 include two lock members 32 extending downwardly therefrom.

Formed about the peripheral edges of bottom plate 18 are a plurality of elongate detents 38, each of which have a generally rectangular configuration. In the preferred embodiment, each of the detents 38 is sized and configured to receive a respective one of the lock members 32 in a manner releasably securing the top plate 12 to the bottom plate 18. In this respect, formed along and extending upwardly from the outer-most edge of each of the elongate detents 38 is a lip member 40. As best seen in FIG. 6, each lip member 40 is sized to extend partially over a respective one of the detents 38. The top plate 12 is releasably secured to the bottom plate 18 by the receipt of the look members 32 into the detents 38 such that the step 34 engages the lip member 40. Advantageously, the lip member 40 is sized and configured to be received into the rectangular recess 36 formed adjacent the lock member 32 so as to provide evenly contoured peripheral edges for the display device 10 when the top plate 12 is secured to the bottom plate 18.

Referring now to FIGS. 4, 7, and 9, to facilitate the detachment of the top plate 12 from the bottom plate 18, formed within the rim member 24 and the peripheral edges of bottom surface 16 are a plurality of coin receiving recesses 42, each of which has a generally semicircular configuration. Importantly, the coin receiving recesses 42 are sized and oriented such that when top plate 12 is secured to bottom plate 18, the coin receiving recesses 42 will form a plurality of coin receiving slots 44 which are sized to receive a portion of a coin 45 to aid in releasing the lock members 32 from engagement with the detents 38, and more particularly the steps 34 from the lip members 40. In the preferred embodiment, two coin receiving recesses 42 are formed along the longitudinal edges 19 of top plate 12 and bottom plate 18 with three coin receiving recesses being formed along the lateral edges 21.

As an alternative to the lock members 32 and detents 38, the top plate 12 and bottom plate 18 of the display device 10 may be secured to one another via two or more spring clips 46, each of which are sized and configured to extend over and releasably receive two of the peripheral edges of the top plate 12 and bottom plate 18 in a manner securing the plates to one another. As best seen in Figure 9, each of the spring clips 46 is specifically shaped to slidably extend over the abutted peripheral edges of the top plate 12 and bottom plate 18. As will be recognized, in those embodiments wherein spring clips 46 are utilized as an alternative to the look members 32 and detents 38, the top plate 12 and bottom plate 18 need not be formed to include coin receiving recesses 42 since there would be no need for the utilization of the coin receiving slots 44 formed thereby.

Referring now to FIGS. 1-3, in the preferred embodiment, one longitudinal peripheral edge 19 of the bottom plate 18 is provided with apertures 48 to allow the display device 10 to be assembled within a conventional three-ring binder 50. Each of the apertures 48 are preferably disposed in extensions 52 formed on and extending outwardly from the selected longitudinal edge 19 of bottom plate 18. It will be recognized that top plate 12 may include ring binder apertures in addition to or as an alternative to the apertures 48 disposed in bottom plate 18.

Additional modifications and improvements of the present invention may also be apparent to those skilled in the art. Thus, the particular combination of parts described and illustrated herein is intended to represent only one embodiment of the invention, and is not intended to serve as limitations of alternative devices within the spirit and scope of the invention.

What is claimed is:

1. A baseball card storage and display device, comprising:
 a substantially rigid, transparent front plate having a generally planar bottom surface;
 a substantially rigid, transparent back plate having a generally planar upper surface; and
 at least four corner bosses formed on and extending upwardly from said upper surface of said back plate for maintaining at least one generally rectangular baseball card in a desired orientation upon said upper surface, said corner bosses each defining a top surface and being oriented to capture only the corners of a maintained baseball card and spaced from one another at distances substantially identical to the length and width dimensions of a maintained baseball card, said corner bosses further extending upwardly to a height slightly exceeding the thickness of a maintained baseball card;

said front plate and said back plate being secured to one another in a contiguous planar orientation with said bottom surface being abutted against the top surface of each of said corner bosses such that a maintained baseball card would be disposed but not compressed between said upper surface and said bottom surface.

2. The device of claim 1 further comprising at least four elongate rib members formed on and extending downwardly from said bottom surface of said front plate, said rib members having a height substantially equal to the thickness of a maintained baseball card and being oriented so as to be insertable between said corner bosses such that said rib members and said corner bosses would circumvent a maintained baseball card when said front plate is secured to said back plate.

3. The device of claim 2 comprising a plurality of corner bosses for orienting a plurality of baseball cards upon said upper surface.

4. The device of claim 3 wherein said corner bosses are formed to orient nine baseball cards upon said upper surface.

5. The device of claim 1 further comprising:
a plurality of lock members formed about and extending downwardly from the peripheral edges of said front plate; and
a plurality of detents formed about the peripheral edges of said back plate;
said detents being sized and configured to receive said lock members in a manner releasably securing said front plate to said back plate.

6. The device of claim 5 wherein said front plate and said back plate further include a plurality of coin-receiving recesses formed about the peripheral edges thereof, said coin-receiving recesses being sized and configured to form coin-receiving slots when said front plate is secured to said back plate for receiving a portion of a coin to aid in releasing said lock members from engagement with said detents.

7. The device of claim 1 further comprising at least two spring clips, each of said spring clips being sized and configured to extend over and releasably receive at least two peripheral edges of said front plate and said back plate in a manner securing said front plate and said back plate to one another.

8. The device of claim 1 wherein said front plate and said back plate are fabricated from plastic.

9. The device of claim 1 wherein one edge of said back plate is provided with apertures to allow said display device to be assembled within a three-ring binder.

10. A baseball card storage and display device, comprising:
a substantially rigid, transparent front plate having a generally planar bottom surface;
a substantially rigid, transparent back plate having a generally planar upper surface and a rim member formed on and extending upwardly from said upper surface about the peripheral edges thereof; and
a plurality of corner bosses formed on and extending upwardly from said upper surface of said back plate, said rim member and said corner bosses being operable to maintain a plurality of generally rectangular baseball cards in desired orientations upon said inner surface, said corner bosses being oriented relative said rim member and one another such that said corner bosses and portions of said rim member capture the corners of maintained baseball cards and said corner bosses being spaced from said rim member and one another at distances substantially identical to the length and width dimensions of maintained baseball cards, said rim member and said corner bosses each defining a top surface and extending upwardly to a height slightly exceeding the thickness of any maintained baseball card;
said front plate and said back plate being secured to one another in a contiguous planar orientation with said bottom surface being abutted against the top surfaces of each of said corner bosses and the top surface of said rim member such that maintained baseball cards would be disposed but not compressed between said upper surface and said bottom surface.

* * * * *